United States Patent Office 3,357,234
Patented Dec. 12, 1967

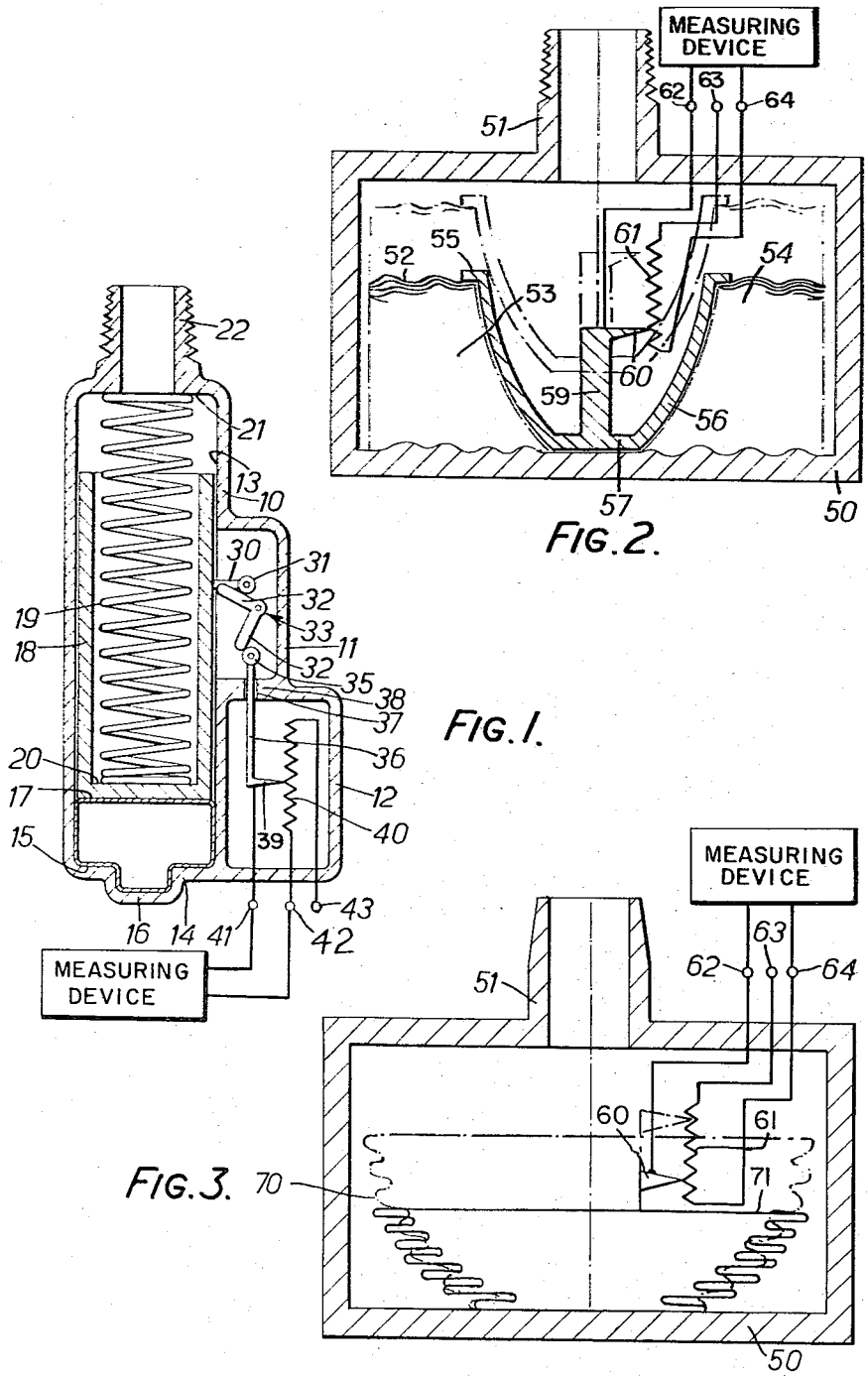

3,357,234
GASEOUS DENSITOMETER
Sheldon S. Thaler, Spring Valley, N.Y., assignor to Simmonds Precision Products, Inc., Tarrytown, N.Y., a corporation of New York
Filed Dec. 30, 1965, Ser. No. 517,757
1 Claim. (Cl. 73—30)

ABSTRACT OF THE DISCLOSURE

An apparatus for determining the density of an unknown gaseous medium by confining a known second gaseous medium in a bellows which expands and contracts causing the known mass to assume the same pressure and temperature as that of the unknown mass and measuring, by potentiometer means connected to the bellows, the volume of the known second mass from which the desired density reading can be calculated.

---

This invention relates to apparatus for the measurement of the density of a gaseous medium, and particularly, but not exclusively, to the measurement of the density of a gaseous medium at elevated temperatures and pressures and over substantial ranges of these parameters.

The determination of the density of a gas or mixture of gases at normal temperatures and pressures involves no special difficulties and many forms of apparatus for such determinations are available. However, the measurement of gas density at elevated temperatures, say of the order of 300° to 3000° F. and elevated pressures, say 1500 lb. per square inch, gives rise to many difficulties, particularly if a high order of accuracy is required.

It is therefore an object of the present invention to provide apparatus for the accurate measurement of gas density at elevated temperatures and pressures and over substantial ranges of these parameters.

According to the present invention there is provided a method for the determination of the density of a first mass of gaseous medium, comprising the steps of confining a known second mass of the same gaseous medium in such a manner that it can expand and contract freely, causing the said known second mass to assume the same pressure and temperature as that of the said first mass, and measuring the volume of said known second mass at said pressure and temperature, whereby the density of the said first mass can be calculated from knowledge of the known second mass and of the volume assumed thereby at said pressure and temperature.

Three embodiments of apparatus in accordance with the invention for the measurement of gas density at elevated temperatures and pressures will now be described, by way of example, with reference to the accompanying diagrammatic drawings, in which:

FIGURE 1 is a longitudinal section of the first embodiment;

FIGURE 2 is a longitudinal section of the second embodiment, which shows the apparatus in one operational condition and in dotted line configuration in another operational condition; and FIGURE 3 is a longitudinal section of the third embodiment similarly showing two operating conditions.

The ideal gas law states that:

$$V/n = RT/P$$

where V is volume, T is temperature, P is pressure, R is the gas constant and $n$ is a factor related to the mass of gas. For a non-ideal gas $V/n$ is equal to a function of T and P, the exact relationship being complex; nevertheless the density of a gas is uniquely determined once the temperature and pressure have been found. It follows that for a given temperature and pressure and a known mass of gas, density can readily be calculated.

The invention is based on the realization that if an infinitely-elastic closed impermeable membrane were inflated with a known mass of nitrogen to a pressure of say 1500 lb. per square inch at room temperature, it would either expand or contract if immersed in a tank containing high pressure, high temperature nitrogen. The pressure and the temperature within the membrane would become equal to the pressure and temperature of the nitrogen in the tank and hence the density inside and outside the membrane would become the same. From a knowledge of the initial mass of the membrane and the volume under equilibrium conditions, the density can then be calculated.

Referring now to FIGURE 1, the apparatus includes a casing 10 of generally cylindrical form but having laterally-extending parts 11, 12 which house mechanism of the apparatus to be described hereinafter. A cylindrical bore 13 within the casing contains at one end 14, a flexible bag or membrane 15 which conforms to the shape of the bore and to the internal shape of a protruding portion 16 at the said end 14.

The face of the bag 15 remote from the protruding portion 16 is in engagement with an end face 17 of a light-weight piston 18 having a length which is equal to a major proportion of the length of the bore 13. The piston is biassed towards the flexible bag 15 by a low-rate helical spring 19 which extends within the piston from the inner face 20 thereof to an end face 21 of the casing 10.

The end face 21 is of annular form and the aperture in the centre of the annulus can communicate through an extension piece 22 with a tank containing a gaseous medium, for example nitrogen, the density of which is to be measured by the apparatus.

The piston 18 carries a lateral arm 30 which extends into the interior of the part 11 of the casing. The end of the arm remote from the piston wall carries a roller 31 which is in engagement with one arm 32 of an inverting linkage 33, which is pivotally mounted in a side wall of the part 11. The other arm 34, of the linkage 32 is in engagement with a roller 35 carried at one end of a rod 36 slidable in an aperture 37 provided in a wall 38 dividing the part 11 from the part 12. The arm 36 carries a slide contact 39 which is in engagement with the winding 40 of a rectilinear potential divider, the connections of which are denoted 41, 42 and 43. The connections lead to an instrument which may be calibrated to give a direct reading of the volume of the bag 15.

The apparatus is designed to have a pressure range of from 20 to 200 atmospheres and an operating temperature range of from minus 65° F. to plus 550° F. In a practical form the approximate dimensions are: length 6 inches and diameter 2 inches. The operating principle of the apparatus is substantially the same as outlined in the general theory referred to above. The inflatable bag 15 is filled with a known mass of nitrogen, or other gaseous medium, the density of which is to be measured, and the extension 22 is used to provide communication with a tank containing nitrogen, the density of which is to be measured. When the nitrogen in the inflatable bag 15 has reached the same temperature and pressure as the nitrogen in the tank (not shown) the piston 18 will have been displaced along the bore 13 and the arm 30 will have moved the mechanical inverting linkage 32 to a new position. In turn the linkage will have varied the output of the potential divider and an indication of the volume of the flexible bag will be given on the instrument. It will then be possible to calculate the density of the nitrogen in the tank.

In the embodiment illustrated in FIGURE 2, the principle of operation is in substance the same as that of the embodiment of FIGURE 1, but the flexible bag is replaced by a welded, nested bellows which is so designed as to have a constant external form but a variable internal form. The bellows has a very low rate in order to offer very little resistance to changes in volume of the nitrogen.

Considering the embodiment in more detail, the apparatus includes a cylindrical casing 50 and a connection 51 which serves to provide communication between the tank (not shown) containing gas the density of which is to be measured and the interior of the casing.

The bellows includes a stack of elements 52 each welded to adjacent elements at the inner and outer diameter thereof and each having a corrugated form. The dotted line configuration of the drawing illustrates the bellows in their expanded condition and the solid line configuration illustrates the bellows in their compressed condition. A chain line 53 indicates the internal form of the bellows in the expanded condition and a chain line 54 indicates the external form of the bellows in the compressed condition. As shown in the drawing, the uppermost annular element of the bellows is secured at its inner diameter to a flange of a member of W cross-section, the outer part 56 of which is of bowl-shape with a flat base 57. A central projection 59 forming the centre limb of the W extends from the base 57 and carries a slide contact 60 of a potential divider 61, the connections of which are diagrammatically shown at 62, 63, 64.

The embodiment of FIGURE 3 is substantially the same as the embodiment of FIGURE 2 and like parts will be given the same reference numerals. In this embodiment the low rate bellows 70 are of convoluted form, preferably made of a single sheet of material, and with the external diameter tapering from the top to the bottom, as illustrated in the drawing. As in the previous embodiment the dotted line configuration of the figure illustrates the bellows in the expanded condition and the solid line configuration illustrates the bellows in the compressed condition. The lowermost convolution of the bellows is secured directly to the interior of the casing 50. The upper end face of the bellows 71 carries the slide 60 of the potential divider 61 which in this embodiment is mounted within the casing laterally of the bellows As in the first and second embodiments the interior of the bellows is filled with a known mass of the same gaseous medium as that of which the density is to be determined. The manner of operation is substantially the same as that of the second embodiment.

The principle of operation of all three embodiments can be briefly explained mathematically as follows:

$$L = K_1 \times 1/V$$

since $$\delta = K_2 \times 1/V$$

therefore $$\delta = K_2/K_1 \times L$$

and since $$M_T = \delta \times V_T$$
$$M_T = K_2/K_1 \times L \times V_T$$

or, if $V_T$ is constant, $$M_T = K_3 \cdot L$$

where

L is range of movement of the bag or bellows,
V is the volume of the bag or bellows,
$\delta$ is density,
$M_T$ is mass of gaseous medium in tank,
$V_T$ is volume of tank,
$K_1$, $K_2$, $K_3$ are constants.

If the range of temperature encountered by the tank is large, then account must be taken in the calculations for expansion of the tank. Assuming the linear co-efficient of expansion for steel is 7 parts per million per degree Fahrenheit the volume co-efficient will be about 20 parts per million or, in other words, an expansion in volume of about 1.2% between the extremes of the range.

The method of measurement of gas density as hereinbefore described has several advantages over methods requiring the measurement of pressure and temperature directly and deducing the mass by the use of one of the non-ideal gas laws.

(a) The gaseous medium in the bag or bellows follows the non-ideal gas laws perfectly rather than to an approximation necessitated by a simplified formula.

(b) Only one transducer is necessary for sensing the desired quantity whereas other possible methods require the sensing of both temperature and pressure.

(c) The transducer of the apparatus does not call for the introduction of springs and hence there cannot be any errors resulting from change of spring rate with temperature.

(d) The accuracy of the apparatus under room temperature would be of the order of ±2% over the full pressure range and a further ±1% owing to temperature range.

I claim:

In an apparatus for the determination of the density of a first mass of a gaseous medium, an annular shaped bellows having an outer diameter which is substantially constant under all conditions of pressure and temperature and an inner diameter which varies, said bellows confining a known second mass of the same gaseous medium in such a manner that it can expand and contract, means for communicating the pressure and temperature of the first mass to said second mass, a bowl-shaped member having an outer surface which conforms substantially to the space defined by the internal form of said bellows in the smallest configuration thereof, said bellosw being secured to said member, measuring means for determining the volume of said known second mass and said pressure and temperature including a projection upstanding within said bowl-shaped member, a potentiometer winding mounted to extend within said bowl-shaped member, and a potentiometer contact on said projection and slidable along said potentiometer winding.

References Cited

UNITED STATES PATENTS 2,000,308   7/1931   Von Schutz _____ 73—30
2,967,427   1/1961   LeBlanc _____ 73—149

RICHARD C. QUEISSER, *Primary Examiner.*

JAMES GILL, *Examiner.*

DOUGLAS SCHNEIDER, *Assistant Examiner.*